US009699163B2

(12) United States Patent
Park

(10) Patent No.: US 9,699,163 B2
(45) Date of Patent: Jul. 4, 2017

(54) METHOD OF MANAGING FILES IN WEBDAV SERVER-EMBEDDED IMAGE FORMING APPARATUS, AND IMAGE FORMING SYSTEM THAT PERFORMS THE METHOD

(71) Applicant: Samsung Electronics Co., Ltd., Suwon-si (KR)

(72) Inventor: Hyun-wook Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/804,811

(22) Filed: Jul. 21, 2015

(65) Prior Publication Data

US 2015/0326555 A1 Nov. 12, 2015

Related U.S. Application Data

(63) Continuation of application No. 14/456,067, filed on Aug. 11, 2014, now Pat. No. 9,098,527, which is a (Continued)

(30) Foreign Application Priority Data

Nov. 24, 2009 (KR) .................. 10-2009-0114162

(51) Int. Cl.
*H04L 29/06* (2006.01)
*G06F 21/44* (2013.01)
(Continued)

(52) U.S. Cl.
CPC ........ *H04L 63/08* (2013.01); *G06F 17/30115* (2013.01); *G06F 17/30194* (2013.01);
(Continued)

(58) Field of Classification Search
CPC ....... G06F 21/6218; G06F 21/44; H04L 67/02
(Continued)

(56) References Cited

U.S. PATENT DOCUMENTS

2002/0120792 A1* 8/2002 Blair ................... H03M 7/30
719/330
2007/0030511 A1 2/2007 Lee
(Continued)

FOREIGN PATENT DOCUMENTS

JP 2008200930 9/2008
JP 2008-250689 10/2008
(Continued)

OTHER PUBLICATIONS

US Notice of Allowance issued Mar. 28, 2014, in U.S. Appl. No. 12/946,076.
(Continued)

*Primary Examiner* — Thomas Lett
(74) *Attorney, Agent, or Firm* — Staas & Halsey LLP

(57) ABSTRACT

A method of managing files in a Web-based Distributed Authoring and Versioning (WebDAV)-embedded image forming apparatus and an image forming apparatus that performs the method. The method includes receiving a connection request from the WebDAV client to manage at least one of a file and a directory stored in a storage unit of the image forming apparatus; receiving login information from the WebDAV client, authenticating the received login information of the WebDAV client, receiving a WebDAV command to control the at least one of the file and the directory from the authenticated WebDAV client, and executing a process with respect to the at least one of the file and the directory with reference to the received WebDAV command.

12 Claims, 6 Drawing Sheets

Related U.S. Application Data continuation of application No. 12/946,076, filed on Nov. 15, 2010, now Pat. No. 8,804,156.

(51) Int. Cl.
*H04L 29/08* (2006.01)
*G06F 21/62* (2013.01)
*G06F 17/30* (2006.01)

(52) U.S. Cl.
CPC .......... *G06F 21/44* (2013.01); *G06F 21/6218* (2013.01); *H04L 67/02* (2013.01)

(58) Field of Classification Search
USPC ........................................................ 358/1.16
See application file for complete search history.

(56) References Cited

U.S. PATENT DOCUMENTS

| | | | |
|---|---|---|---|
| 2008/0201617 A1 | 8/2008 | Ohara et al. | |
| 2008/0239387 A1 | 10/2008 | Otsuka | |
| 2008/0239389 A1* | 10/2008 | Kudo | G06F 3/1209 358/1.15 |
| 2008/0252944 A1 | 10/2008 | Otsuka | |
| 2010/0202018 A1 | 8/2010 | Akiyama et al. | |
| 2011/0149343 A1* | 6/2011 | Matoba | G06F 3/1267 358/1.15 |
| 2011/0264920 A1* | 10/2011 | Rieffel | H04L 9/008 713/189 |

FOREIGN PATENT DOCUMENTS

| | | |
|---|---|---|
| JP | 2008250524 | 10/2008 |
| JP | 2009-093414 | 4/2009 |
| KR | 10-2007-0010965 | 1/2007 |
| KR | 10-2007-0017716 | 2/2007 |

OTHER PUBLICATIONS

US Office Action issued Oct. 9, 2013, in U.S. Appl. No. 12/946,076.
US Office Action issued May 30, 2013, in U.S. Appl. No. 12/946,076.
US Notice of Allowance issued Jun. 24, 2015, in U.S. Appl. No. 14/456,067.
Korean Notice of Allowance dated Feb. 9, 2015 in Korean Patent Application No. 10-2013-0004102.
Korean Notice of Allowance dated May 20, 2013 issued in KR Application No. 10-2009-0114162.
U.S. Appl. No. 14/456,067, filed Aug. 11, 2014, Hyun-wook Park, Samsung Electronics Co., Ltd.
U.S. Appl. No. 12/946,076 (now U.S. Pat. No. 8,804,156), filed Nov. 15, 2010, Hyun-wook Park, Samsung Electronics Co., Ltd.

* cited by examiner

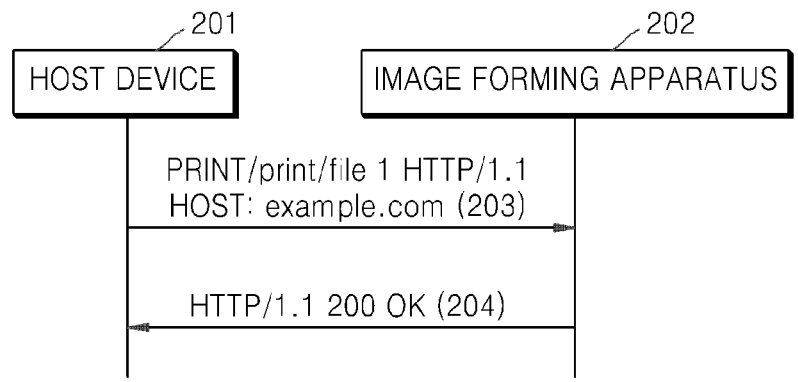
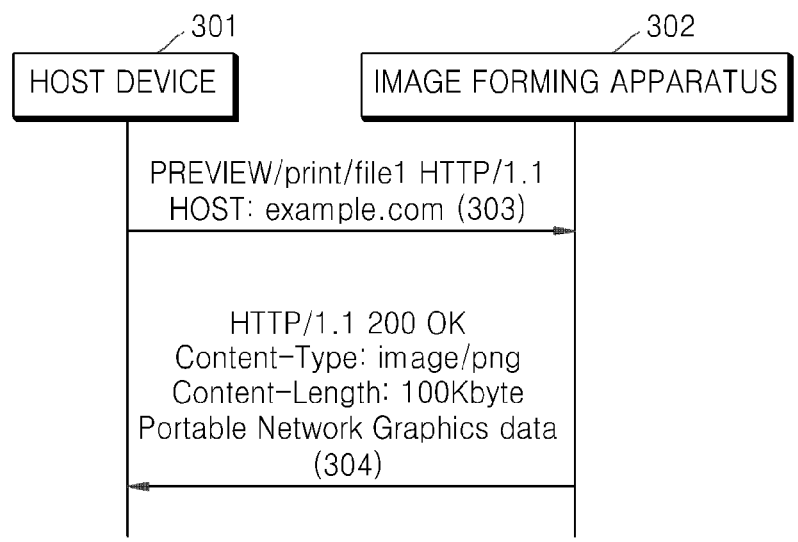

US 9,699,163 B2

METHOD OF MANAGING FILES IN WEBDAV SERVER-EMBEDDED IMAGE FORMING APPARATUS, AND IMAGE FORMING SYSTEM THAT PERFORMS THE METHOD

CROSS-REFERENCE TO RELATED APPLICATIONS

This is a continuation of U.S. patent application Ser. No. 14/456,067, filed on Aug. 11, 2014, which is a continuation of U.S. patent application Ser. No. 12/946,076, filed on Nov. 15, 2010, which claims priority under 35 U.S.C. §119(a) from Korean Patent Application No. 10-2009-0114162, filed on Nov. 24, 2009, in the Korean Intellectual Property Office, the disclosures of which are incorporated herein in their entirety by reference.

BACKGROUND

1. Field of the Invention

The present general inventive concept relates to a method of managing files in a Web-based Distributed Authoring and Versioning (WebDAV) server-embedded image forming apparatus, and an image forming system that performs the method.

2. Description of the Related Art

WebDAV, which is an abbreviation for Web-based Distributed Authoring and Versioning, refers to a set of extensions to the hypertext transfer protocol (HTTP) that allows computer-users to remotely edit and manage files collaboratively on a web server on the web. In particular, WebDAV is an Internet Engineering Task Force (IEFT) standard for supporting joint authoring on the web, and relevant content thereof is recorded and distributed by Request For Comments (RFC) 4918. WebDAV enables users at remote sites to jointly edit and manage a file by using the Internet. Image forming apparatuses, including printers, scanners, or multi-function peripherals, have at least one function among ones such as printing, copying, scanning, fax transmission and reception, email transmission, and file transmission to a server.

SUMMARY

The present general inventive concept provides a method of remotely managing a file stored in a WebDAV server-embedded image forming apparatus conveniently by using the Internet, and an image forming system that performs the method.

Additional features and utilities of the present general inventive concept will be set forth in part in the description which follows and, in part, will be obvious from the description, or may be learned by practice of the present general inventive concept.

According to another feature of the present general inventive concept, there is provided a Web-based Distributed Authoring and Versioning (WebDAV) server-embedded image forming apparatus connectable to a WebDAV client, the image forming apparatus including: a storage unit to store at least one file, a communication interface unit to receive a connection request from the WebDAV client that manages at least one of a directory or the file stored in the storage unit, and receiving login information from the WebDAV client, an authentication unit to authenticate the received login information of the WebDAV client, a WebDAV server to execute the WebDAV command that is received from the authenticated WebDAV client and controls the file, with respect to at least one of the file and the directory, and a control unit for controlling in such a way that a process corresponding to the WebDAV command requested by the WebDAV client is executed.

According to another feature of the present general inventive concept, there is provided a Web-based Distributed Authoring and Versioning (WebDAV) client-embedded host device connectable to a WebDAV server-embedded image forming apparatus, the host device including: a WebDAV client to request a connection to the WebDAV server of the image forming apparatus, a communication interface unit to transmit login information to the image forming apparatus connected according to the request, receiving a result of authentication from the image forming apparatus, and receiving a list of document boxes corresponding to the login information and a list of WebDAV commands supported by the WebDAV server, according to the result of authentication, a user interface unit to receive a selection signal to select at least one file stored in one document box stored in one document box selected from the received list of document boxes and to select one WebDAV command from the received list of WebDAV commands, and a control unit to request the image forming apparatus to execute a process of managing the selected file according to the selected WebDAV command, wherein the communication interface unit transmits information about the selected file, and the selected WebDAV command to the image forming apparatus.

Yet, another feature of the present general inventive concept provides a file management system to manage data files communicated over a network including an HTTP application layer, including a WebDAV server to control storage of data files in response a WebDAV server command, an image forming apparatus in communication with the WebDAV server to process data files in response to a WebDAV processing command, and a host device in communication with the image forming apparatus via the network and including a WebDAV client to generate at least one of a WebDAV server signal including an HTTP data file extension indicating a WebDAV server command and a WebDAV processing signal including an HTTP data file extension indicating a WebDAV processing command.

In still another feature of the present general inventive concept, a file management system to manage data files communicated over a network including an HTTP application layer includes a storage unit to store at least one file, a communication interface unit to receive a connection request from the WebDAV client that manages at least one of a directory and the file stored in the storage unit, and receiving login information from the WebDAV client, an authentication unit to authenticate the received login information of the WebDAV client, a WebDAV server to execute the WebDAV command that is received from the authenticated WebDAV client and controls the file, with respect to at least one of the file and the directory, a control unit to execute a process corresponding to the WebDAV command requested by the WebDAV client, a WebDAV client to request a connection to the WebDAV server of the image forming apparatus, a communication interface unit to transmit login information to the image forming apparatus connected according to the request, to receive a result of authentication from the image forming apparatus, and to receive a list of document boxes corresponding to the login information and a list of WebDAV commands supported by the WebDAV server, according to the result of authentication, a user interface unit to receive a selection signal to select at least one file stored in one document box stored in one document box selected from the received list of document boxes and to select one WebDAV command from the received list of WebDAV commands, and a control unit to request the image forming apparatus to execute a process of managing the selected file according to the selected WebDAV command, wherein the communication interface unit transmits information about the selected file, and the selected WebDAV command to the image forming apparatus.

BRIEF DESCRIPTION OF THE DRAWINGS

The above and other features and advantages of the present general inventive concept will become more apparent by describing in detail exemplary embodiments thereof with reference to the attached drawings in which:

FIG. 2 illustrates a flow of data when a process corresponding to a PRINT WebDAV command is performed, according to an exemplary embodiment of the present general inventive concept;

FIG. 3 illustrates a flow of data when a process corresponding to a PREVIEW WebDAV command is performed, according to an exemplary embodiment of the present general inventive concept;

DETAILED DESCRIPTION OF THE EMBODIMENTS

Figure 1:
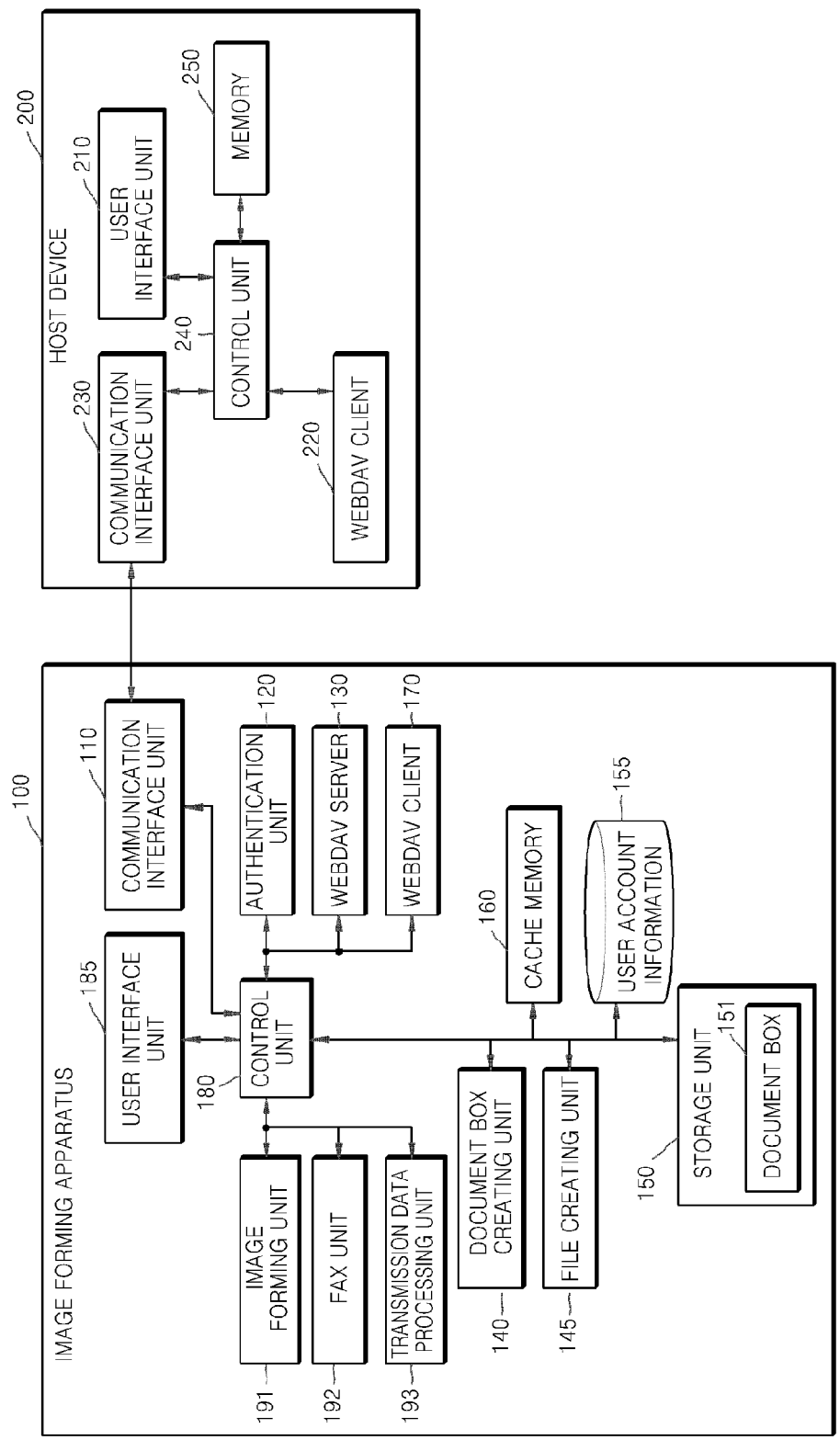
FIG. 1 illustrates a block diagram of an image forming system, according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 illustrates a block diagram of an image forming system according to an exemplary embodiment of the present general inventive concept. Referring to FIG. 1, the image forming system includes an image forming apparatus 100 and a host device 200. The host device may be operated by a user to select a data file and/or a WebDAV command which executes the image forming apparatus to process the selected data file, as discussed in greater detail below.

Although the image forming system according to an exemplary embodiment shown in FIG. 1 is simply illustrated as including only one host device 200 connected to the image forming apparatus 100, the present general inventive concept is not limited thereto. For example, a plurality of host devices, each as the host device 200, may be connected to the image forming apparatus 100. In addition, a plurality of image forming apparatuses, each as the image forming apparatus 100, may be connected to the host device 200.

The image forming apparatus 100 and the host device 200 may transmit and/or receive data via communication interface units 110 and 230, respectively, therein, for example, via a common network including, but limited to, a wired or wireless network and/or a wire serial communication. In this regard, examples of networks include the Internet, a Local Area Network (LAN), a Wireless LAN, and a Wide Area Network (WAN), but are not limited thereto. It would be obvious to one of ordinary skill in the art that any network capable of transmitting and receiving information may be used.

Although not illustrated in FIG. 1, the image forming apparatus 100 and the host device 200 may further include other commonly used elements, as will be obvious to one of ordinary skill in the art.

Referring to FIG. 1, the image forming apparatus 100 includes the communication interface unit 110, an authentication unit 120, a WebDAV server 130, a document box creating unit 140, a file creating unit 145, a storage unit 150 that includes a document box 151, user account information 155, a cache memory 160, a WebDAV client 170, a control unit 180, a user interface unit 185, an image forming unit 191, a fax unit 192, and a transmission data processing unit 193. The host device 200 includes a user interface unit 210 that may be operable by a user, a WebDAV client 220, the communication interface unit 230, a control unit 240 and a memory 250.

The image forming apparatus 100 may store files in the storage unit 150 and/or the WebDAV server 130, and may process the files according to various functions including, but not limited to, printing, scanning, copying, fax transmission and/or reception, email transmission, and transmission to a server. In this regard, the files may be stored in the storage unit 150 of the image forming apparatus 100. In at least one exemplary embodiment, the files may be created by using at least one piece of data including, but not limited to, scan data, fax data, email data and printing data to be printed, scanned, copied, faxed, emailed, and/or transmitted to a server.

The WebDAV server 130 may be embedded in the image forming apparatus 100, or may be located externally and/or remotely from the image forming apparatus 100. In addition, a plurality of externally located WebDAV servers may be in communication with the image forming apparatus 100.

The scan data may be created as a result of scanning performed in the image forming apparatus 100, the fax data may be created as a result of fax transmission and/or reception performed in the image forming apparatus 100, and the e-mail data may be created as a result of emailing performed in the image forming apparatus 100. The printing data may be received from the host device 200 connected to the image forming apparatus 100.

The control unit 180 is in communication with the various units of the image processing device 100 mentioned above, including the WebDAV server 130 and the storage unit 150. Accordingly, the control unit 180 may control the WebDAV server to control data files stored in the WebDAV server and/or the storage unit 150 of the image forming apparatus

100 in response to a WebDAV server command. Additionally, the control unit 180 may also control the image forming apparatus 100 to process data files stored in the WebDAV server and/or the storage unit 150 of the image forming apparatus 100 in response to a WebDAV processing command. The WebDAV server and processing commands is described in greater detail below.

In addition, although FIG. 1 illustrates a single control unit 180 in communication with the various units of the image processing apparatus 100 and the WebDAV server 130, it can be appreciated that a separate control unit may be included with each of the various units of the image forming apparatus to execute a respective operation. Accordingly, a separate control unit may be included the WebDAV server 130 to control data files stored therein in response to a WebDAV command selected by a user of the host device 200.

The communication interface unit 110 transmits and/or receives data to and from an external device (not shown) through the network. The communication interface unit 110 according to the current embodiment may include a modem to send and/or receive fax data, a network module to connect to a network, and a universal serial bus (USB) host module to form a data transfer channel with a portable storage medium, according to the functions of the image forming apparatus 100.

The image forming apparatus 100 is in communication with the host device 200 via a network including an HTTP application layer. Accordingly, the image forming apparatus 100 may receive a remote connection request, login information and a WebDAV command request initiated by a user of the host device 200 via the communication interface unit 110 for the purpose of accessing the image forming apparatus 100 and/or the WebDAV server. In response, the control unit 180 of the image forming apparatus 100 may transmit to the host device 200 a result of executing the WebDAV command that the host device 200 requested to execute via the communication interface unit 110.

In this regard, in general, the login information may be received from a user of the host device 200 who inputs an ID and a password when the host device 200 is connected to the image forming apparatus 100. However, the present general inventive concept is not limited thereto, and the login information may be automatically provided to the image forming apparatus 100 from the host device 200 when the image forming apparatus 100 and the host device 200 are connected. In other words, the image forming apparatus 100 may receive the login information from the host device 200 according to settings, without the user performing a separate login process.

The authentication unit 120 authenticates the login information received via the communication interface unit 110. In particular, when the image forming apparatus 100 and the host device 200 are connected, the authentication unit 120 checks whether the login information received from the host device 200 via the communication interface unit 110 matches with information stored in the user account information 150. If the login information received via the communication interface unit 110 matches the information stored in the user account information unit 155, the authentication unit 120 authenticates the host device 200 as an authorized user.

If the host device 200 is authenticated as a result of the authentication by the authentication unit 120, a user of the host device may access a list of WebDAV commands stored in the WebDAV server 130 that control storage of data files and/or that process data files using the image forming apparatus 100. The list of WebDAV commands may include WebDAV server commands that command the control unit 180 to control data files stored in the WebDAV server 130, and WebDAV processing commands that command the control unit 180 to control the image forming apparatus 100 to process data files. The processing performed by the image forming apparatus includes, but is not limited to, printing, scanning, faxing, emailing, and/or data transmission.

The host device 200 may output one of the WebDAV commands to request the WebDAV server 130 and/or image forming apparatus 100 to execute the selected a WebDAV command included in the command list. For example, the control unit 180 may control the WebDAV server 130 to execute a process corresponding to the WebDAV command selected by a user of the host device 200, thereby controlling the files stored in the storage unit 150, with respect to at least one of a file and a directory stored in the WebDAV server 130. In this regard, the WebDAV command may be an HTTP protocol-based command or a WebDAV protocol-based command, and may also be extendable according to a command supported by the WebDAV server 130. In at least one exemplary embodiment, the WebDAV command may be at least one of PROPFIND, PROPPATCH, MKCOL, COPY, MOVE, LOCK, UNLOCK, FAX, SCAN, PRINT, PREVIEW and EMAIL.

Examples of the WebDAV command that output by the host device 200 may select to request the WebDAV server 130 to execute may include HTTP protocol-based Methods such as HEAD, GET, POST, PUT, DELETE, TRACE, OPTIONS, and CONNECT Methods; WebDAV protocol-based Methods such as PROPFIND, PROPPATCH, MKCOL, COPY, MOVE, LOCK, and UNLOCK Methods. Additionally, other extended Methods may be performed in the image forming system according to at least one exemplary embodiment, such as a PRINT request Method, a PREVIEW request Method, a FAX request Method, a SCAN request Method, and/or an EMAIL request Method.

For example, the control unit 180 may control the WebDAV server 130 to execute a HTTP protocol-based command selected by a user of the host device 200 to perform a process corresponding to the HTTP protocol-based command with respect to a file stored in the image forming apparatus 100 and/or the WebDAV server 130, and in response, the control unit 180 transmits to the host device 200 a response to the request. Additionally, the WebDAV server 130 may execute a WebDAV protocol-based command that output by the host device 200 requested to execute, which corresponds to a WebDAV protocol-based command selected by the user with respect to a file stored in the image forming apparatus 100 and/or WebDAV server 130. In response to receiving the WebDAV command request selected by the user, the control unit 180 in communication with the WebDAV server 130 may transmit a response to the request to the host device 200.

For example, a user of the host device 200 may request to execute a PUT command, which is a HTTP protocol-based command, with respect to an externally created file created by a host device located remotely from the image forming apparatus 100. In this case, the control unit 180 in communication with the WebDAV server 130 may determine whether to execute the PUT command with respect to the externally created file.

The image forming apparatus 100 may create and distribute files on its own. However, the security of the image forming apparatus 100 may be breached by a virus when externally created files created outside the image forming apparatus 100 are randomly uploaded, for example, from a remotely located host device 200 to the image forming apparatus 100.

To prevent this, a user of the image forming apparatus 100 may select whether the WebDAV server 130 should execute the PUT command output by the host device 200. More specifically, the control unit 180 in communication with the WebDAV server 130 may determine whether to execute the PUT command that the host device 200 has output to execute, and may provide a response to the PUT command according to a result of the determination. Accordingly, the communication interface unit 110 transmits the response from the control unit 180 in communication with the WebDAV server 130 to the host device 200.

For example, if the control unit 180 in communication with the WebDAV server 130 determines to execute the PUT command that the host device 200 has output to execute, an external file that is created by a remotely located host device 200 outside the image forming apparatus 100 is received from the host device 200, and is stored in the storage unit 150 of the image forming apparatus 100. Then, the control unit 180 in communication with the WebDAV server 130 may provide a response indicating that the PUT command was executed.

On the other hand, if the control unit 180 in communication with the WebDAV server 130 determines not to execute the PUT command that the user of the host device 200 has selected, the control unit 180 in communication with the WebDAV server 130 provides a response, for example, "HTTP/1.1 403 Forbidden", indicating that the PUT command has an error.

Thus, the control unit 180 in communication with the WebDAV server 130 may prevent random uploading of files to the image forming apparatus 100, thereby ensuring security of the image forming apparatus 100.

As another example, if a user of the host device 200 selects a PROPFIND WebDAV command, which is a WebDAV protocol-based command, that provides information about properties of the file selected by the host device 200, a signal indicating the WebDAV command selected by the user may be forwarded from the host device 200 to the WebDAV server 130. The property information may then be transmitted to the host device 200 via the communication interface unit 110. In this regard, the property information includes information about, for example, an owner and a user who creates the file selected via the host device 200, a model name/serial number of the image forming apparatus 100 used to create the file, and a creation Method of the selected file (for example, whether it was created from fax data, scan data, etc.).

Thus, the host device 200 may be utilized to remotely check the properties of the files stored in the image forming apparatus 100 conveniently by using a PROPFIND WebDAV command.

In addition, the host device 200 may be utilized to change the properties of a file or a directory stored in the image forming apparatus 100 by selecting PROPPATCH WebDAV command, which is then sent from the host device to the WebDAV server. Various other commands may be output by the host device 200 to remotely control data files stored in the image forming apparatus 100 and/or WebDAV server 130. For example, a user of the host device 200 may create a new file in the image forming apparatus 100 and/or WebDAV server by selecting an MKCOL WebDAV command. The host device 200 may be used to copy a file and at least one of the properties to one or more document boxes stored in the image forming apparatus 100 and/or WebDAV server by selecting a COPY WebDAV command. the host device 200 may be used to move a file and at least one of the properties to one or more document boxes 151 stored in the image forming apparatus 100 and/or WebDAV server by selecting a MOVE WebDAV command. Additionally, The host device 200 may set a file lock of a data file stored in the image forming a apparatus 100 and/or WebDAV server 130 by selecting a LOCK WebDAV command, and may set a file unlock of a data file stored in the image forming a apparatus 100 and/or WebDAV server 130 by selecting an UNLOCK WebDAV command.

Methods of executing HTTP protocol- and WebDAV protocol-based WebDAV commands in the WebDAV server 130 are well-known, and thus, a detail description thereof will not be provided here. As described above, the image forming system according to the at least one exemplary embodiment may use the document box 151 included with the image forming apparatus 100, in addition to a directory of a file system using the HTTP protocol and the WebDAV protocol. In this regard, the document box 151 will be described in more detail.

The control unit 180 may control the image forming apparatus 100 to execute other extended WebDAV commands, in addition to a HTTP protocol- and WebDAV protocol-based WebDAV command, in the image forming system according to at least one exemplary embodiment. For example, the control unit 180 may control the image forming apparatus 100 to execute a PRINT WebDAV command, a PREVIEW WebDAV command, a FAX WebDAV command, a SCAN WebDAV command, and an EMAIL WebDAV command that the host device 200 requests to execute.

For example, a user of the host device 200 may select one of the files stored in the image forming apparatus 100, and selects a PRINT WebDAV command in order to print the selected file using the image forming apparatus 100. Then, the control unit executes the PRINT WebDAV command with respect to printing data corresponding to the file selected by the host device 200. In response, the image forming unit 191 performs a process of printing the printing data according to a result of executing the PRINT WebDAV command by the control unit 180. Thereafter, the control unit 180 may transmit the result of executing the PRINT WebDAV command to the host device 200 via communication interface unit 110.

The host device 200 may be used to select one of the files stored in the image forming apparatus 100, and then select a PREVIEW WebDAV command. The control module 180 in communication with the WebDAV server 130 executes a PREVIEW WebDAV command with respect to printing data corresponding to the file selected by a use of the host device 200. The control unit 180 transmits to the host device 200 image data corresponding to the printing data obtained as a result of executing the PREVIEW WebDAV command via the communication interface unit 110.

The host device 200 may also be used to manage files and directories stored in the image forming apparatus 100 by using a WebDAV protocol, which is an extended HTTP protocol, without being required to install an additional application, that depends on the image forming apparatus 100, to manage files in the image forming apparatus 100. Accordingly, a user of the host device 200 may manage and print files stored in the image forming apparatus 100 and/or WebDAV server 130 using a web-based client. In addition, the host device 200 may be used to remotely print and preview the files stored in the image forming apparatus 100 and/or WebDAV server 120 conveniently by using an extended WebDAV protocol.

In another exemplary feature, the control unit 180 in communication with the WebDAV server 130 may execute a FAX WebDAV command. In other words, the control unit 180 may execute a FAX WebDAV command, which the host device 100 output, with respect to fax data selected by the user of the host device 200.

For example, a user of the host device 200 may select one of the files stored in the image forming apparatus 100 and/or WebDAV server, and select a FAX WebDAV command. In response, the control module 180 in communication with the WebDAV server 130 executes the FAX WebDAV command with respect to fax data corresponding to the file selected by the user of host device 200, and may control the fax unit 192 to perform fax transmission with respect to the fax data. Then, the control module 180 may transmits the fax data to a facsimile, and transmit the result of the performed facsimile to the host device 200 via the communication interface unit 110.

Thus, the host device 200 may remotely perform a fax transmission with respect to the files stored in the image forming apparatus 100 and/or the WebDAV server 130 conveniently by using an extended WebDAV protocol.

In the image forming system according to at least one exemplary embodiment, the control module 180 in communication with the WebDAV server 130 may execute a SCAN WebDAV command, and control the image forming apparatus 100 to perform a scanning process in response the host device 200 outputting the SCAN WebDAV command.

Additionally, the transmission data processing unit 193 may perform an email transmission with respect to a file selected by using the host device 200 in response to the user's selection of the EMAIL WebDAV command.

Thus, the host device 200 may remotely perform an email transmission, and/or a scanning process with respect to the files stored in the image forming apparatus 100 and/or WebDAV server 130 conveniently by using an extended WebDAV protocol.

The WebDAV server 130 may provide a list of WebDAV commands in response to a request from the host device 200. In particular, the control module 180 in communication with the WebDAV server 130 may forward a list of WebDAV commands requested by the user of the host device 200 in response to authenticating the host device 200 via the authentication unit 200.

Thus, the host device 200 may check the list of WebDAV commands that may be executed by the image forming apparatus 100 and/or WebDAV server 130, in addition to the files and directories stored in the image forming apparatus 100 and/or the WebDAV server 130. Accordingly, a user of the host device 200 may conveniently select a process to be performed in the image forming apparatus 100 and/or the WebDAV server 130.

The image forming apparatus 100 according to at least one exemplary embodiment may include the document box 151. In this case, the control module 180 in communication with the WebDAV server 130 may execute a WebDAV command that the host device 200 requested to execute, to control a data file associated with the document box 151.

If the host device 200 is authenticated as a result of the authentication performed by the authentication unit 120, the document box creating unit 140 may create the document box 151, and the document box 151 is stored in the storage unit 150 and/or WebDAV server 130. The document box 151 may function as a directory of the WebDAV server 130 and/or storage unit 150. However, if a document box corresponding to authentication information corresponding to the host device 200 is present in the storage unit 150, the document box creating unit 140 may not create the document box 151.

The file creating unit 145 may create a file to be stored in the document box 151, by using at least one of printing data, scan data, fax data, and e-mail data. In particular, the file creating unit 145 may generate an image file to be stored in the document box 151 of the image forming apparatus 100 and/or WebDAV server 130 by converting printing data, scan data, fax data and/or email data that are generated during the processes of printing, copying, scanning, fax transmission and reception, email transmission, and transmitting a file to a server, respectively, into an image file.

In at least one exemplary embodiment, the control module 180 in communication with the WebDAV server 130 may execute other extended WebDAV commands, in addition to a HTTP protocol-based command and a WebDAV protocol-based command described above, with respect to a file stored in the document box 151.

For example, the control module 180 in communication with the WebDAV server 130 may execute a LOCK WebDAV command while the file creating unit 145 creates an image file. In this regard, the WebDAV server 130 may automatically execute the LOCK WebDAV command if the file creating unit 145 starts to create the image file, even when the host device 200 does not request to execute the LOCK WebDAV command.

In addition, the control module 180 in communication with the WebDAV server 130 may execute an UNLOCK WebDAV command if the file creating unit 145 completes the creation of the image file. In this regard, the control module 180 in communication with the WebDAV server 130 may automatically execute the UNLOCK WebDAV command if the file creating unit 145 completes the creation of the file, even when the host device 200 does not request to execute the UNLOCK WebDAV command.

In other words, the host device 200 may be blocked from accessing a file being created by the file creating unit 145. Thus, the control module 180 in communication with the WebDAV server 130 may prevent distribution of the file being created by the file creating unit 130 before the creation is completed.

In addition, if the creation of the file is completed, the file creating unit 145 may store creation information about the file in the storage unit 150 as property information of the file. As described above, the host device 200 may check the stored property information by requesting to execute a PROPFIND WebDAV command.

The storage unit 150 may store at least one document box 151, and the document box 151 may store at least one file.

The document box 151 of the image forming apparatus 100 may store files t according to properties. In particular, the control unit 180 stores the files to be stored in the image forming apparatus 100 in the document boxes 151, which are also classified according to properties, according to their properties. In this regard, the properties of the document box 151 may include, but are not limited to, a file creation user, a file creation date, a file creation location, a file type, and a file's secure information setting. Examples of the document box 151 may include, but are not limited to, a common box used in common by a plurality of users, a secure box with a secure setting used in common by a plurality of users, and user boxes corresponding to individual users.

Examples of the storage unit 150 may include, but are not limited to, a read only memory (ROM), a random access memory (RAM), a flash memory, a hard disk drive (HDD), which is a kind of magnetic computer memory, and an optical disk drive.

The user account information unit 155 may include login information about a plurality users of the image forming apparatus 100. The user's login information may refer to information identifying individual users, and may include, for example, login IDs/passwords of users, and an ID/password of the host device 200 connected to the image forming apparatus 100.

The document box creating unit 140 may create document boxes 151 corresponding to respective users of the image forming apparatus 100 with reference to the user account information unit 155, which may store user account information about each of the users. As mentioned above, the storage unit 150 may store the created document boxes 151.

Thus, a user of the host device 200 may utilize the document boxes 151 corresponding with directories of the WebDAV server 130 and/or storage unit 150 to request the control module 180 in communication with the WebDAV server 130 to execute a WebDAV command. For example, the WebDAV command that the user of the host device 200 requested to execute may be executed selectively with respect to the document box 151 corresponding to a property of the files and/or authentication information of the user. Thus, it may be more convenient for the user of the host device 200 to manage the files stored in the image forming apparatus 100 and/or WebDAV server 130.

The cache memory 160 may store uniform resource locators (URLs) of the files stored in the image forming apparatus 100. In other words, the cache memory 160 may store the URLs of the files stored in the storage unit 150. If the image forming apparatus 100 is not operated for a predetermined duration of time, the image forming apparatus 100 switches to a power-saving mode in which power supplied to the storage unit 150 is cut off, in order to reduce power consumption. In this regard, the predetermined duration of time may vary according to usage environments, for example, the predetermined duration of time may be 1 hour. If the host device 200 requests to execute a WebDAV command when the image forming apparatus 100 is in the power-saving mode, a process corresponding to the WebDAV command that the user requested to execute may not be executed since the power supplied to the storage device 150 is cut off.

Thus, if the user of the host device 200 requests to execute the WebDAV command when the image forming apparatus 100 is in the power-saving mode, the control module 180 in communication with the WebDAV server 130 retrieves a URL stored in the cache memory 160 and sends the retrieved URL to the host device 200 via the communication interface unit 110. Thus, in the power-saving mode in which supply of power to the storage unit 150 is cut off, the control module 180 of the image forming apparatus 100 may execute a GET command, which is a HTTP command that the host device 200 requested to execute, by using the cache memory 160. In other words, even when the image forming apparatus 100 is in the power-saving mode, the user of the host device 200 may search for the files stored in the storage unit 150.

In addition, as the user of the host device 200 accesses the storage unit 150, the control module 180 in communication with the WebDAV server 130 releases the image forming apparatus 100 from the power-saving mode. In other words, the control module 180 in communication with the WebDAV server 130 controls power to be supplied to the storage unit 150 of the image forming apparatus 100. When the executed WebDAV command requested by the host device 200, such as COPY, MOVE, DELETE, PRINT, or PREVIEW, is needed to access the storage unit 150, the control module 180 in communication with the WebDAV server 130 controls power to be supplied to the storage unit 150.

Thus, even when the image forming apparatus 100 is in the power-saving mode, the host device 200 may remotely manage the files stored in the image forming apparatus 100.

As described above, the user of the host device 200 may remotely manage the files stored in the image forming apparatus 100 in terms of the operations of printing, previewing, fax transmission, scanning, and/or email transmission, conveniently, by using the WebDAV server 130 included in the image forming apparatus 100. The image forming apparatus 100 may include the WebDAV client 170, in addition to the WebDAV server 130. In other words, the image forming apparatus 100 may include at least one of the WebDAV server 130 and the WebDAV client 170, according to usage environments.

Alternatively, a user of the image forming apparatus may utilized the WebDAV client 170 included with the image forming apparatus 100 to communicate a file stored in the document box 151 corresponding to the information authenticated by the authentication unit 120 to an external WebDAV server in communication with the image forming apparatus 100 via the communication interface unit 110. Then, the communication interface unit 110 transmits the file to the external WebDAV server of the image forming apparatus 100. For example, when transmitting the file stored in the storage unit 150 to an external device, such as an external WebDAV server, of the image forming apparatus 100, the file may be conveniently transmitted by using a WebDAV protocol, i.e., not using a File Transfer Protocol (FTP)/Server Message Block (SMB) protocol.

Thus, the user of the host device 200 may select a file stored in the document box 151 and transmit the selected file to the external WebDAV server of the image forming device 100 by using the WebDAV protocol. In addition, the user may scan a document by using the image forming apparatus 100 and transmit the scan data to the external WebDAV server of the image forming apparatus 100 by using "Scan to WebDAV" function implemented by the document box 151.

As such, the file stored in the image forming apparatus 100 may be remotely transmitted to the external WebDAV server of the image forming apparatus 100, and stored therein conveniently by using the WebDAV client 170 included in the image forming apparatus 100.

As discussed in detail above, the control unit 180 may control the overall function of the image forming apparatus 100. That is, the control unit 180 may control the elements of the image forming apparatus 100 in order to perform a process corresponding to the WebDAV command that the host device 200 has requested to execute.

The user interface unit 185 may receive input information from the user and may provide output information to the user. For example, the user interface unit 185 may include input and output devices such as a keyboard, a mouse, a touch pad, a display including, but not limited to, a graphics user interface (GUI), a local user interface (LUI), a liquid crystal display (LCD) panel, and a display panel; and software modules to implement such devices.

The image forming unit 191, the fax unit 192, and the transmission data processing unit 193 may perform various functions of the image forming apparatus 100 according to at least one exemplary embodiment. The image forming unit 191 may perform the process of printing the files, the fax unit 192 may perform the process of transmitting the files by fax, and the transmission data processing unit 193 may perform a process of transmitting the files to an external device, such as a server, a portable storage medium, or a computer system.

In other words, the image forming unit 191 performs the process of printing according to the PRINT WebDAV command selected by a user of the host device 200, the fax unit 192 performs the process of fax transmission according to the FAX WebDAV command that the user of the host device 200 requested to execute, and the transmission data processing unit 193 performs the process of emailing according to the EMAIL WebDAV command that the user of the host device 200 requested to execute.

Thus, the user of the host device 200 may remotely manage the files stored in the image forming apparatus 100 and/or WebDAV server 130 by using the WebDAV commands stored in the WebDAV server 130 in communication with the image forming apparatus 100, and may remotely transmit the files stored in the image forming apparatus 100 and/or WebDAV server 130 by using the WebDAV client 170 included in the image forming apparatus 100.

The user of the host device 200 may manage the files and directories stored in the image forming apparatus 100, which includes the WebDAV server 130, by using the WebDAV protocol. The user of the host device 200 according to at least one exemplary embodiment may include at least one of a general computer system connected to the image forming apparatus 100 to control the same, and another image forming apparatus separate from the image forming apparatus 100. For example, the host device 200 may include a general computer system, a mobile system, a personal digital assistant (PDA), or an image forming apparatus which are connectable to the image forming apparatus 100 to remotely manage the files stored in the image forming apparatus 100.

The user interface unit 210 of the host device 200 may receive input information from a user and provides output information to the user. For example, the user interface unit 210 may receive a selection signal to select at least one of the files stored in one document box 151 selected from the list of document boxes received from the image forming apparatus 100, and may receive a selection signal to select one WebDAV command from among the list of WebDAV commands received from the image forming apparatus 100. In this regard, the selected WebDAV command may include a PRINT WebDAV command, a PREVIEW WebDAV command, a SCAN WebDAV command, a FAX WebDAV command, and/or an EMAIL WebDAV command.

That is, the user of the host device 200 selects one document box 151 from the list of document boxes, and selects at least one file stored therein using the user interface unit 210. In addition, the user may select one WebDAV command, for example, a PRINT WebDAV command, from the list of WebDAV commands displayed on the user interface unit 210 of the host device 200.

The WebDAV client 220 may request a connection to the image forming apparatus 100 in communication with the WebDAV server 130, manage the files stored in the image forming apparatus 100 by using the WebDAV protocol, and request the image forming apparatus 100 to execute a process of printing, previewing, scanning, email transmission, or the like with respect to the files stored in the image forming apparatus 100 and/or WebDAV server 130.

The communication interface unit 230 transmits login information to the image forming apparatus 100 in communication with the host device 200, and receives authentication information, and a list of WebDAV commands and a list of document boxes corresponding to the authentication information from the image forming apparatus 100. In addition, the communication interface unit 230 may transmit the information about the file selected by the user and the WebDAV command to the image forming apparatus 100. In this regard, the information about the file may include a storage location of the file.

The control unit 240 controls the host device 200 to request the control module 180 of the image forming apparatus 100 to execute a process, for example, printing, corresponding to the WebDAV command, with respect to the files stored in the image forming apparatus 100 and/or WebDAV server, by using the WebDAV protocol.

The memory 250 may store a program that may control the host device 200. The memory 250 may include, but is not limited to, a program memory (not shown) and a data memory (not shown). The program memory may also store a program to control the overall operation of the host device 200. The data memory temporarily stores data generated during the execution of the program.

The host device 200 may be a separate image forming apparatus 100. In this regard, files stored in this image forming apparatus 100 may be transmitted to the image forming apparatus 100 including the WebDAV server 130 by using the WebDAV protocol. If the image forming apparatus 100 in communication with the host device 200 includes a document box, a "Scan to WebDAV" may be utilized to scan a file stored in the document box. Accordingly, scan data may be transmitted to the image forming apparatus 100 including the WebDAV server 130 by using the WebDAV protocol.

Thus, the host device 200 may remotely manage files stored in the image forming apparatus 100 including the WebDAV server 130 conveniently by using the WebDAV client 220, and may perform a process of requesting printing, previewing, scanning, email transmission, and/or fax transmission with respect to the files stored in the image forming apparatus 100 and/or WebDAV server 130.

As described above, the image forming system may be utilized to print files via the WebDAV protocol. The image forming system includes the host device 200, which may allow a user thereof to request a connection to the image forming apparatus 100 and the WebDAV server 130, and allows a file to be printed via a PRINT WebDAV command request to execute the process of printing. Accordingly, the image forming apparatus 100 may execute the PRINT WebDAV command with respect to printing data corresponding to the file received from the user of the host device 200 and prints the printing data according to a result of executing the PRINT WebDAV command. Thus, the user may of the host device 200 may utilize the image forming system to remotely perform the process of printing conveniently.

FIG. 2 illustrates a flow of data when a process corresponding to a PRINT WebDAV command is performed, according to an exemplary embodiment of the present general inventive concept. Referring to FIG. 2, a host device 201 may request to execute a PRINT WebDAV command, and an image forming apparatus 202 transmits a response to the PRINT WebDAV command. The request by the host device 201 to execute the PRINT WebDAV command, denoted by 203 in FIG. 2, indicates that a PRINT WebDAV command is requested with respect to a file 'file 1' stored in a 'print' directory, and the host is 'example.com'. The response of the image forming apparatus 202, denoted by 204, indicates that the process corresponding to the PRINT WebDAV command has been performed.

FIG. 3 illustrates a flow of data when a process corresponding to a PREVIEW WebDAV command is performed, according to an exemplary embodiment of the present general inventive concept. Referring to FIG. 3, a host device 301 may request to execute a PREVIEW WebDAV command, an image forming apparatus 302 transmits a response to the PREVIEW WebDAV command. The request from the host device 301 to execute the PREVIEW WebDAV command, denoted by 303, indicates that a PREVIEW WebDAV command is requested with respect to the file 'file 1' stored in the 'print' directory, and the host is 'example.com'. The response of the image forming apparatus 302, denoted by 304, indicates that the process corresponding to the RERVIEW WebDAV command has been performed. Thus, the image forming apparatus 302 provides image data as a result of executing the PREVIEW WebDAV command to the host device 301.

Figure 4:
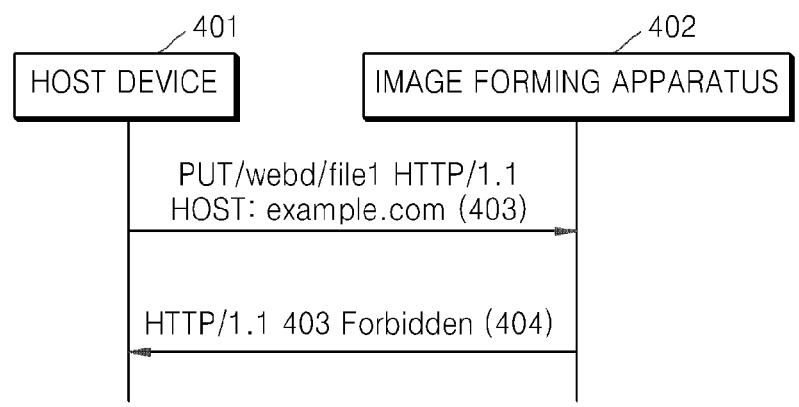
FIG. 4 illustrates a flow of data when a process corresponding to a PUT command is performed, according to an exemplary embodiment of the present general inventive concept.

FIG. 4 illustrates a flow of data when a process corresponding to a PUT command is performed, according to an exemplary embodiment of the present general inventive concept. Referring to FIG. 4, a host device 401 may request to execute a PUT command, an image forming apparatus 402 transmits a response to the PUT command. The request from the host device 401 to execute the PUT command, denoted by 403, indicates that the PUT command is requested with respect to a file 'file 1' stored in a 'web' directory, and the host is 'example.com'. The response of the image forming apparatus 402, denoted by 404, indicates that the process corresponding to the PUT command has not been performed. As described above, the image forming apparatus 402 may restrict executing the PUT command with respect to an external file, and thus provide the host device 401 with a response indicating that the process corresponding to the PUT command that the host device 401 requested to execute cannot be performed with respect to the external file. The response may then be displayed on a user interface unit (UI) 210 to notify a user of the host device of the restriction of the PUT command execution.

Figure 5:
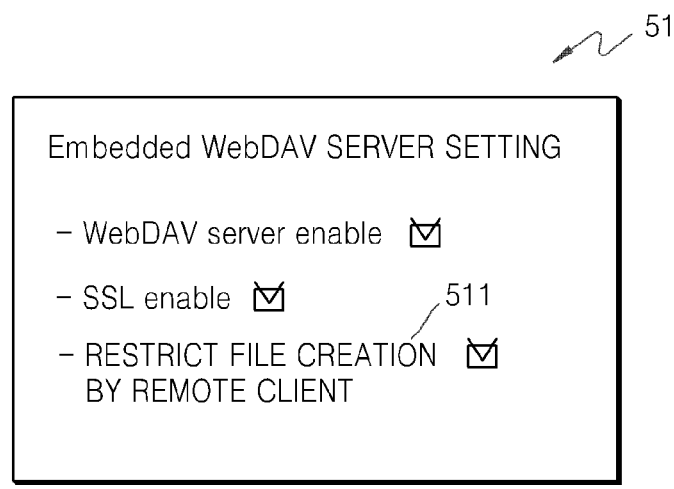
FIG. 5 illustrates an user interface (UI) of the image forming apparatus of FIG. 1 to set an option to restrict an upload of an external file, according to an exemplary embodiment of the present general inventive concept.

FIG. 5 illustrates a user interface (UI) 51 of the image forming apparatus 100 to set an option to restrict an upload of an external file, according to an exemplary embodiment of the present general inventive concept. The UI 51 to set the option may be displayed on the user interface unit 185, for example, a display panel, of the image forming apparatus 100. The user may set the option, for example, by touching the display panel as an example of the user interface unit 185. Thus, the user may set the option to restrict the upload of an external file created outside the image forming apparatus 100, for example, by touching a box to "Restrict file creation by remote client", or may unset the option.

Figure 6:
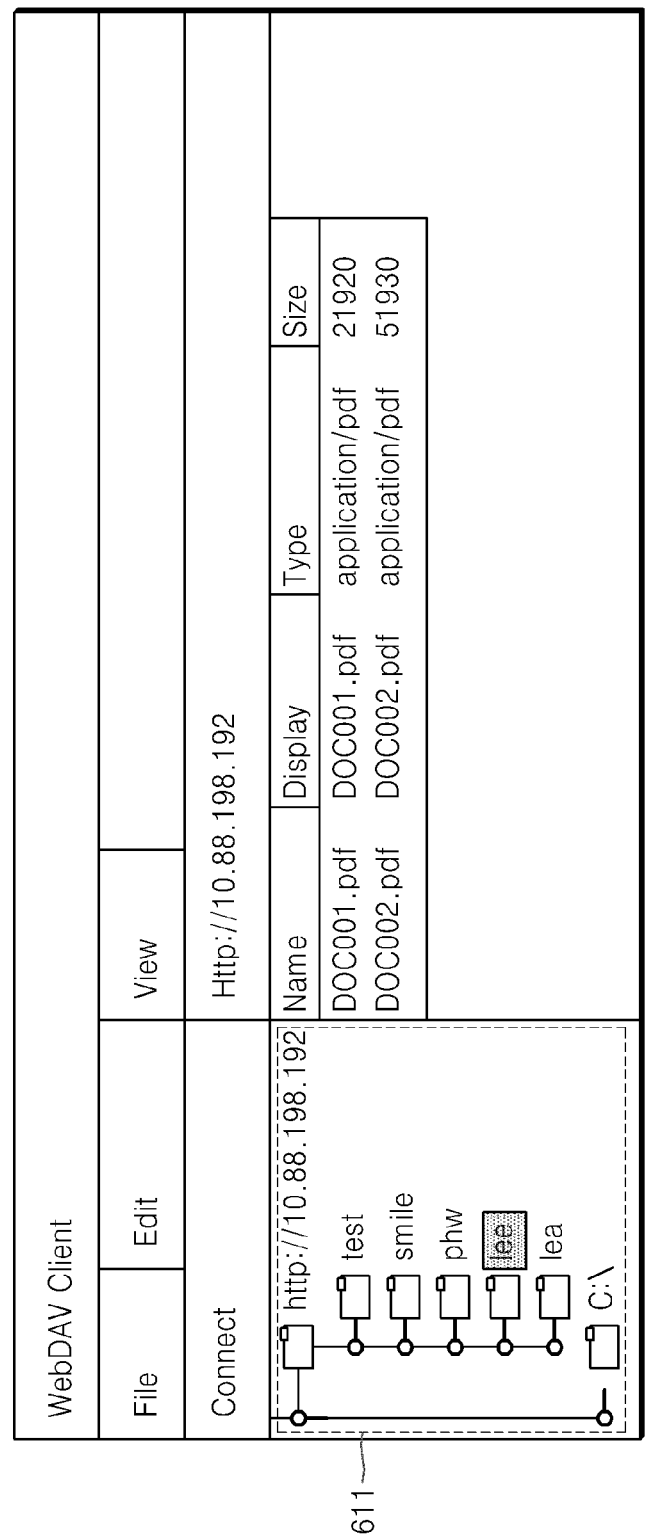
FIG. 6 illustrates a WebDAV client user interface (UI) displayed on a user interface unit of a host device of FIG. 1, according to an exemplary embodiment of the present general inventive concept.

FIG. 6 illustrates a WebDAV client user interface (UI) 61 displayed on the user interface unit 210 of the host device 200, according to an exemplary embodiment of the present general inventive concept. Referring to FIG. 6, the WebDAV client UI 61 displays an area 611 including an address of the image forming apparatus 100 connected to the host device 200, and a pane including a list of document boxes 151 stored in the image forming apparatus 100. In this regard, if the document boxes 151 are not used, it will be obvious to one of ordinary skill in the art that the list of document boxes 151 may be configured as, for example, a directory of a file system according to the use environment of the image forming apparatus 100. If the user selects one document box from the list of document boxes 151 by using the user interface unit 210, information about the files stored in the selected document box 151, for example, name, type, and/or size of each of the files, may be displayed.

Figure 7:
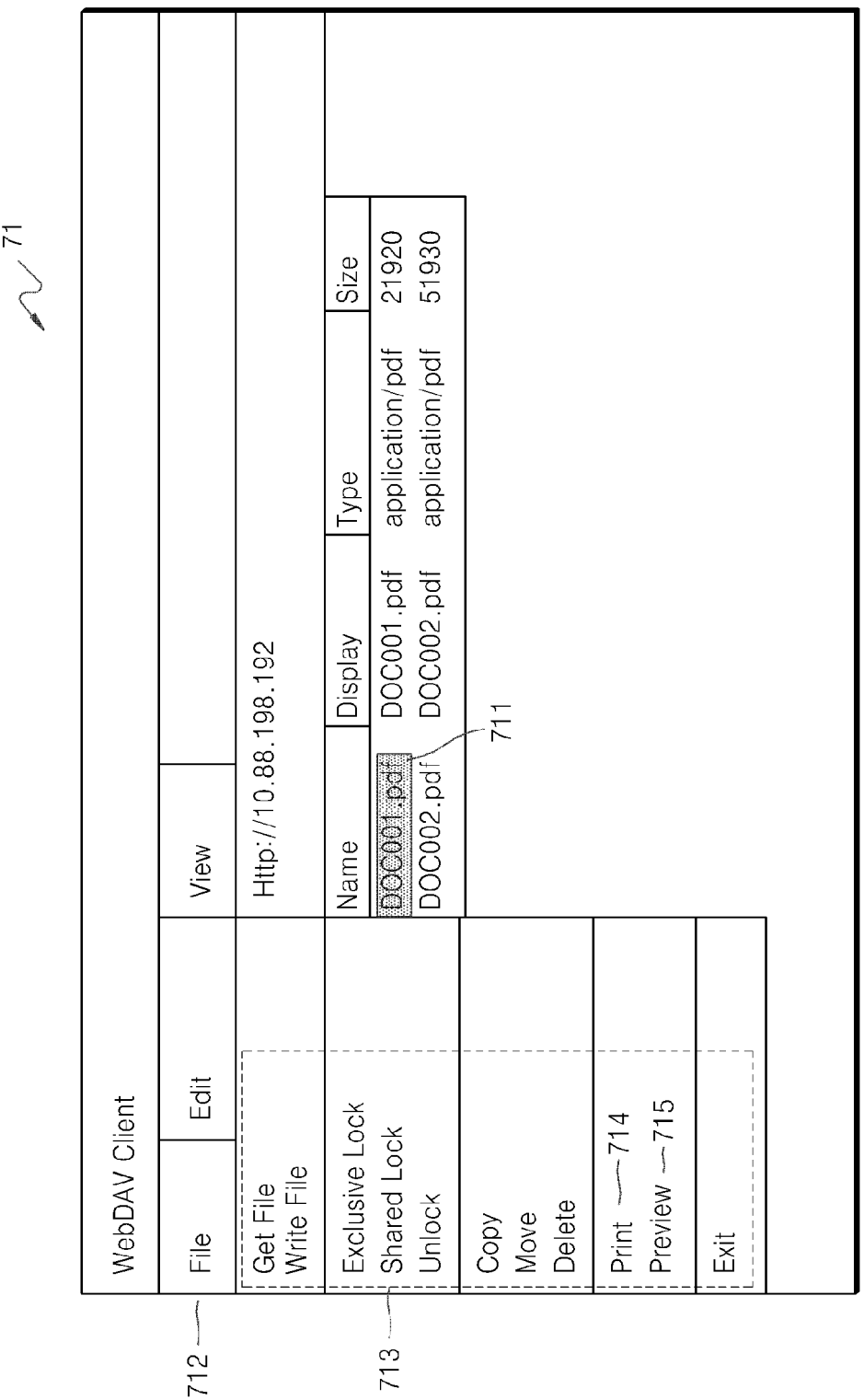
FIG. 7 illustrates a WebDAV client user interface (UI) displayed on the user interface unit of the host device, according to another exemplary embodiment of the present general inventive concept.

FIG. 7 illustrates a WebDAV client user interface (UI) 71 displayed on the user interface 210 of the host device 200, according to another exemplary embodiment of the present general inventive concept. If the user selects one file 711 of the files stored in the document box 151 displayed on the WebDAV client UI 71 and selects a file tab 712, a list 713 of WebDAV commands requestable by the user of the host device 200 is displayed. The user may request a WebDAV command to be executed by the image forming apparatus 100 by selecting the WebDAV command from the list 713 of WebDAV commands via the user interface unit 210.

For example, the user may request the image forming apparatus 100 to execute a process of printing a selected file 711 "DOC001.pdf" by selecting a PRINT WebDAV command 714. The user of the host device 200 may request the image forming apparatus 100 to execute a process of previewing the selected file 711 "DOC001.pdf" by selecting a PREVIEW WebDAV command 715.

However, if the PRINT WebDAV command 714 or the PREVIEW WebDAV command 715 is not used according to the setting of the image forming apparatus 100, the PRINT WebDAV command 714 or the PREVIEW WebDAV command 715 may not be displayed or activated.

Thus, the user may control the image forming apparatus 100 to perform processes by conveniently selecting the processes performable by the image forming apparatus 100 with reference to the list 713 of WebDAV commands.

Figure 8:
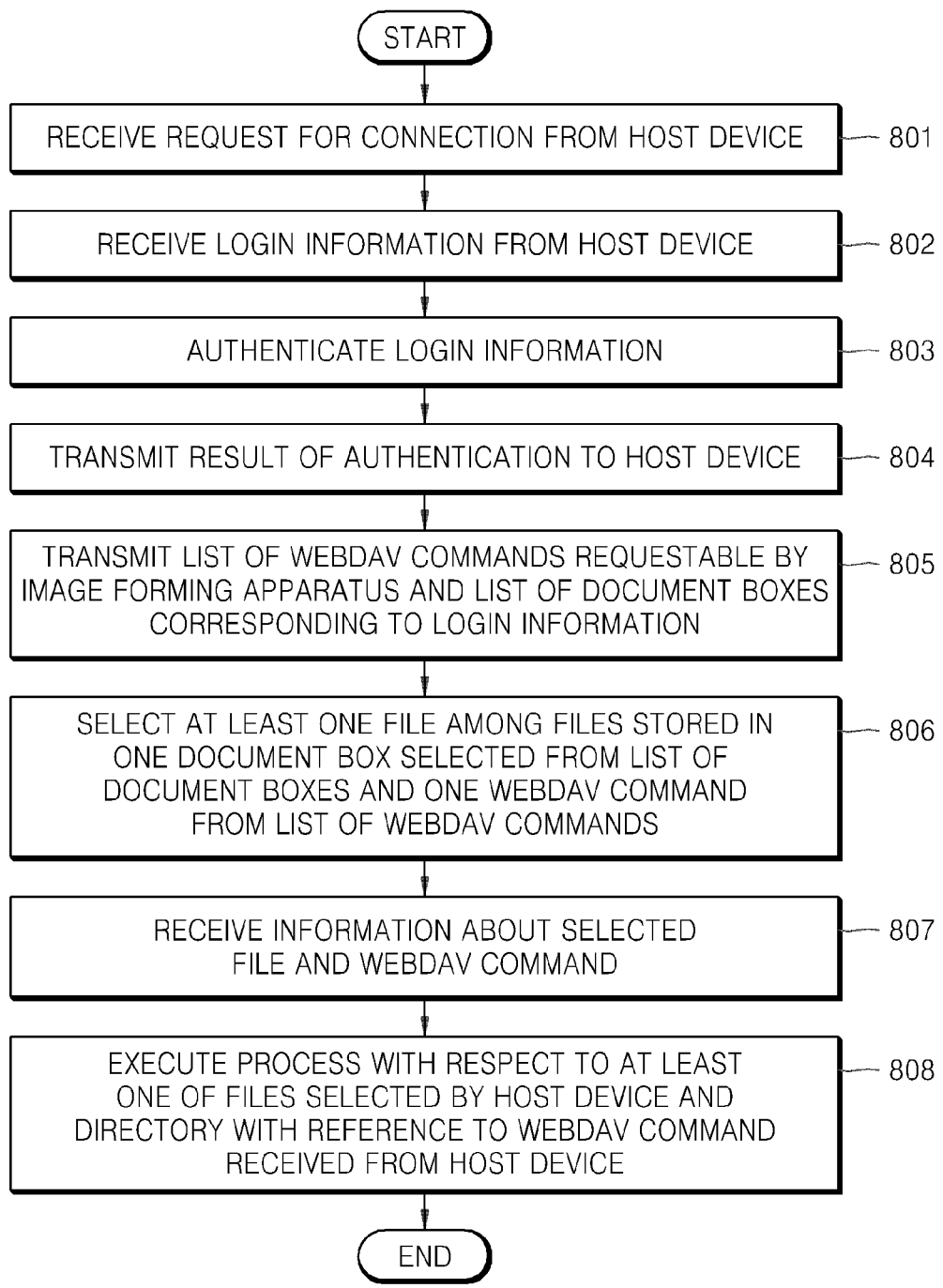
FIG. 8 is a flowchart of a method of managing files in the image forming apparatus of FIG. 1 by using a WebDAV protocol, according to an exemplary embodiment of the present general inventive concept.

FIG. 8 is a flowchart of a method of managing files in the image forming apparatus of FIG. 1 by using a WebDAV protocol, according to an exemplary embodiment of the present general inventive concept. Referring to FIG. 8, an exemplary method of the image forming system illustrated in FIG. 1 above will also apply to the method of FIG. 8 that will be described hereinafter.

In operation 801, the communication interface unit 110 receives a connection request from the host device 200. I For example, a user utilizing the WebDAV client 220 of the host device 200 may request a connection to the image forming apparatus 100, which is in communication with the WebDAV server 130. In this regard, the connection request may be performed via the communication interface unit 230 by an HTTP request.

In operation 802, the communication interface unit 110 receives login information from the host device 200. In operation 803, the authentication unit 120 authenticates the received login information.

In operation 804, the communication interface unit 110 transmits the result of the authentication to the host device 200. In operation 805, the communication interface unit 110 transmits to the host device 200 a list of WebDAV commands and a list of document boxes 151 corresponding to the login information retrieved a control module 180 in communication with the by the image forming apparatus 100. The list of document boxes 151 and the list of WebDAV commands may be then be transmitted from the image forming apparatus 100 to the host device 200, and may be displayed on the user interface unit 230.

In operation 806, the user interface unit 210 of the host device 200 receives selection signals from the user of the host device to select at least one file among the files stored in at least one document box 151 from the received list of document boxes, and one WebDAV command from the received list of WebDAV commands.

In operation 807, the communication interface unit 110 receives information about the selected file and WebDAV command from the host device 200.

In operation 808, the control module 180 in communication with the WebDAV server 130 performs a process with respect to at least one of the files selected by the host device 200 and a directory with reference to the WebDAV command received from the host device 200.

Therefore, a user of the WebDAV client-embedded host device 200 may conveniently manage the files stored in the image forming apparatus 100 by using the WebDAV server 130.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, according to the one or more exemplary embodiments of the present general inventive concept, a host device including an embedded WebDAV client may remotely manage files stored in an image forming apparatus in communication with a WebDAV server, conveniently.

While examples of the general inventive concept have been shown and described with reference to exemplary embodiments thereof, it will be understood by those of ordinary skill in the art that various changes in form and details may be made therein without departing from the spirit and scope of the present general inventive concept as defined by the following claims.

What is claimed is:

1. A method of providing remote sharing of a file stored in an image forming apparatus to at least one client, the method comprising:
receiving a request, through a protocol supporting Distributed Authoring, from a client to access a memory of an image forming apparatus;
transmitting information, related to an access to the memory, to the client;
receiving a command, through the protocol, from the client; and
executing a process to the at least one of a file and a directory according to the received command.

2. The method of claim 1, wherein the information related to the access to the memory comprises a list of at least one command supported by the image forming apparatus.

3. The method of claim 1, the transmitting of the information comprises:
receiving login information from the client;
authenticating the received login information; and
transmitting a list of document box corresponding to the received login information.

4. The method of claim 1, further comprising:
creating a document box corresponding to the received login information; and
creating a file to be stored in the document box by using at least one of printing data, scan data, fax data and email data.

5. The method of claim 1, further comprising:
if the command is received from the client when the image forming apparatus operates in a power-saving mode,
transmitting uniform resource locators (URL) of the file stored in the memory to the client.

6. The method of claim 1, further comprising:
if the command is received from the client when the image forming apparatus operates in a power-saving mode,
supplying power to the memory of the image forming apparatus.

7. An image forming apparatus providing remote sharing of a file stored in the image forming apparatus to at least one client, the image forming apparatus comprising:
a memory configured to store at least one of a file or a directory;
a communication interface configured to transmit/receive data to/from at least one client; and
a controller configured to control the communication interface to transmit an information, which is related to an access to the memory, to the client in response to receiving a request, through a protocol supporting distributed authoring, from a client to access a memory of the image forming apparatus, and execute a process to the at least one of the file and the directory in response to receiving a command, through the protocol, from the client.

8. The image forming apparatus of claim 7, wherein the information related to the access to the memory comprises a list of at least one command supported by the image forming apparatus.

9. The image forming apparatus of claim 7, wherein the communication interface receives login information from the client, the controller authenticates the received login information, and the communication interface transmits a list of document box corresponding to the received login information.

10. The image forming apparatus of claim 7, wherein the controller creates a document box corresponding to the received login information, and a file to be stored in the document box by using at least one of printing data, scan data, fax data and email data.

11. The image forming apparatus of claim 7, the controller controls the communication interface to transmit uniform resource locators (URL) of the file stored in the memory to the client, if the command is received from the client when the image forming apparatus operates in a power-saving mode.

12. The image forming apparatus of claim 7, further comprising a power supply,
wherein the controller controls the power supply to supply power to the memory, if the command is received from the client when the image forming apparatus operates in a power-saving mode.

* * * * *